Figure 1:
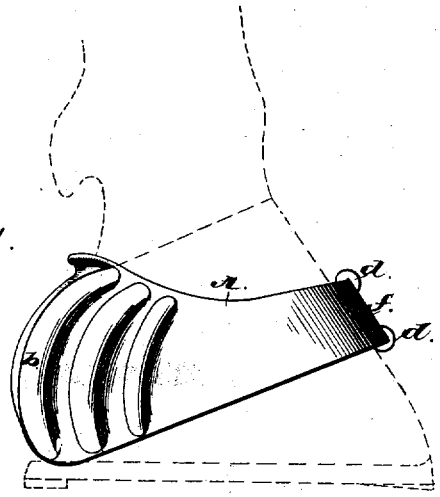

T. GOLDEN.

QUARTER BOOT.

No. 10,587. Reissued Apr. 28, 1885.

Witnesses:
Charles S. Hyer.
Russell N. Scott.

Inventor:
Thomas Golden.
By Dewarble
Atty.

N. PETERS, Photo-Lithographer, Washington, D. C.

UNITED STATES PATENT OFFICE.

THOMAS GOLDEN, OF NEW YORK, N. Y.

QUARTER-BOOT.

SPECIFICATION forming part of Reissued Letters Patent No. 10,587, dated April 28, 1885.

Original No. 310,044, dated December 30, 1884. Application for reissue filed March 16, 1885.

*To all whom it may concern:*

Be it known that I, THOMAS GOLDEN, of the city, county, and State of New York, have invented a new and useful Improvement in Attachments to Quarter-Boots for Horses, of which the following is a full, clear, and exact description thereof, which will enable others skilled in the art to which it appertains to make and use the same, reference being had to the accompanying drawings, and to the letters of reference marked thereon, which form a part of this specification.

My invention relates to an improvement in that class of devices which are attached to quarter-boots for horses to prevent the same from slipping; and the invention consists in the construction and arrangement of the parts, as will be hereinafter fully described and claimed.

The object of my invention is to provide an attachment for such quarter-boots which, when applied, will hold the boot in the right position on the foot, and thereby prevent injury from overreaching when the boot is placed on the forward foot, and render the boot easy of adjustment, economical in use, stable, and firm in location, and readily and easily removed.

I am aware that attachments for the same purpose have been used on boots made of leather; but such boots soon become stiff, and consequently harsh to the foot, are with considerable difficulty adjusted to or removed from the foot with the attachments used, are affected by dampness or dryness of the weather, as well as by the wet or dry condition of the roads, and hence the attachments are of little use.

My boot is made of india-rubber or other elastic material, preferably in one piece, and is cast or molded in form and shape to fit the foot, and by reason of its elasticity may be readily suited to a large or small foot. The clip or attachment serves to hold the boot in the desired position. This clip is made of iron or other suitable material, and is so constructed that it may be readily placed in position, or removed when the boot is removed. The boot is corrugated or ribbed on the rear or outward portions, so as to provide a cushion or elastic shield over the heel of the foot where the injury is likely to occur.

I have found in practice that boots made as herein described, when properly adjusted with the clip, absolutely prevent all injury from overreaching. The clip may also be made of such thickness as may be desired.

The boot is not affected by the weather, nor by the wet or dry condition of the roads, and does not become stiff or harsh from use. Being cast or molded, the boot can be manufactured and sold cheaply; and the clip, being simple in construction, may also be readily and cheaply made.

I make the boot of india-rubber, but deem any composition thereof its equivalent. I also prefer to make the clip of malleable iron, though other kinds of iron or other metals may be used.

Figure 2:
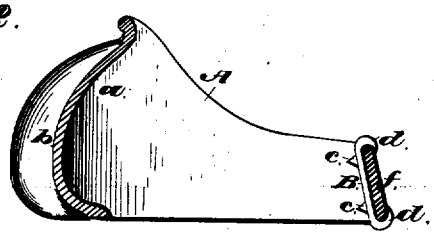
Figure 3:
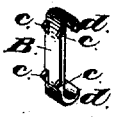

In the accompanying drawings, forming a part of this specification, and in which like letters of reference indicate similar parts, Figure 1 is a side elevation of a horse-boot with my improved attachment applied. Fig. 2 is a sectional elevation of the same, and Fig. 3 is a perspective view of the attachment or clip detached.

A is the quarter-boot made of an elastic material, and preferably in one piece, and formed with a cup, *a*, for the quarters. Corrugations are formed to provide cushions *b* on the outer sides of the cup.

B is the attachment or clip, of metal, formed with the points *c c* on its inner surface, and with claws *d d* on its ends. These claws or hooks are passed over the edges of the front strap, *f*, of the boot, with the points projecting inward, so that they will engage the hoof of the horse when the boot is in place, as shown in Fig. 1.

I prefer to use my attachment with the boot shown in the drawings, which is made of a single piece; but it is obvious that it may be applied to any of the various protectors which have a front strap passing over the hoof.

Having thus described my invention, what I claim as new, and desire to secure by Letters Patent, is—

1. As an improved article of manufacture, an attachment to quarter-boots or protectors, consisting of the clip B, formed with the points *c* on its inner face, and claws *d d* on its ends, substantially as set forth.

2. The combination, with the front strap of the quarter-boot A, of the clip B, secured to its under side, and formed with the points *c*, and the securing-claws *d*, engaging the edges of the front strap of the boot, substantially as set forth.

3. In combination with a boot or protector made of india-rubber, and provided with corrugations or ribs on the rear portions or sides, a clip having points *c* on its inner face, and claws *d d* on its ends, substantially as described.

4. In combination with the front part of a quarter-boot made of india-rubber in one piece, and having ribs or corrugations on the back portion and rear sides, a clip secured to the under side and formed with points *c*, and securing-claws *d*, engaging the edges of the boot, substantially as described.

5. In combination with the clip, substantially as described, a boot or protector made of india-rubber, and provided with ribs or corrugations, for the purposes set forth.

6. A horse-boot made of elastic material, having rear and side hollow corrugations or cushions made homogeneous, and provided with a suitable clip, substantially as described.

In testimony whereof I affix my signature in presence of two witnesses.

THOMAS GOLDEN.

Witnesses:

CHARLES H. LAEN,

WM. E. GOLDEN.